United States Patent [19]
Lienhard et al.

[11] 3,714,137
[45] Jan. 30, 1973

[54] PROCESS FOR THE PRODUCTION OF POLYVINYLIDENE FLUORIDE IN THE PRESENCE OF A PEROXYDISULFATE INITIATOR AT AN ACIDIC PH

[75] Inventors: Klaus Lienhard, 8223 Trostberg; Dieter Ulmschneider, 624 Konigstein, both of Germany

[73] Assignee: Suddeutsche Kalkstickstoff-Werke AG, Trostberg, Germany

[22] Filed: July 31, 1970

[21] Appl. No.: 60,114

[30] Foreign Application Priority Data

Aug. 5, 1969 Germany.....................P 19 39 852.8

[52] U.S. Cl..........260/92.1, 260/29.6 F, 260/92.8 W
[51] Int. Cl................................................C08f 3/20
[58] Field of Search......................260/92.1, DIG. 28

[56] References Cited

UNITED STATES PATENTS 3,031,437  4/1962  Iserson............................260/92.1 R
2,435,537  2/1948  Ford................................260/92.1 R Primary Examiner—Harry Wong, Jr.
Attorney—Christen & Sabol

[57] ABSTRACT

Vinylidene fluoride is polymerized in an acidic aqueous medium in the presence of a peroxide disulfate polymerization initiator in a concentration of less than 0.5 gram/liter of the liquid reaction phase.

5 Claims, No Drawings

PROCESS FOR THE PRODUCTION OF POLYVINYLIDENE FLUORIDE IN THE PRESENCE OF A PEROXYDISULFATE INITIATOR AT AN ACIDIC PH

The present invention relates to improvements in the preparation of polyvinylidene fluoride from monomeric vinylidene fluoride.

In the known polymerization of vinylidene fluoride, it has been conventional to use as catalysts or polymerization initiators inorganic peroxy compounds, such as potassium peroxydisulfate, preferably in combination with reducing agents, for instance sodium bisulfite, or organic peroxides, such as ditertiary butyl peroxide or diisopropylpercarbonate.

The organic peroxides have the disadvantage of not being soluble in water so that the polyvinylidene fluoride is produced in hydrophobic agglomerates which are difficult to comminute. Colloidal aqueous dispersions are produced with organic peroxides only if the polymerization proceeds in the presence of expensive perfluorated emulsifiers, such as perfluoro octanoic acid. Diiosopropylpercarbonate is very unstable and, therefore, it is available only in desensitized condition. However, the desensitizing agents usually interfere with the polymerization reaction. Furthermore, the use of organic peroxides also require relatively large amounts of the initiator, and it is difficult to obtain polymers of high molecular weight therewith.

U.S. Pat. No. 2,435,537 proposes the use of ammonium peroxydisulfate in a concentration of 2 grams/liter of the aqueous polymerization reaction phase at a pressure of at least 300 atmospheres to polymerize vinylidene fluoride. The polymerization is carried out at an alkaline pH, i.e., in the presence of borax. The resultant polyvinylidene fluoride has considerably lower thermal stability than such polymers produced with organic peroxy compound. U.S. Pat. No. 3,193,539 teaches the production of such thermally stable polymers.

It is the primary object of this invention to make use of the advantages of a peroxydisulfate polymerization initiator in the polymerization of vinylidene fluoride while producing a polyvinylidene fluoride having at least as high a thermal stability as obtained with the use of organic peroxy compounds as catalysts.

It has been found that two conditions are essential for the thermal stability of the polymer, i.e., the hydrogen ion concentration in the liquid reaction phase during polymerization and the concentration of the initiator in the liquid phase in the reactor. Accordingly, the polymerization is carried out at an acidic pH and in the presence of a peroxydisulfate polymerization initiator concentration of less than 0.5 gram/liter of the liquid reaction phase at an elevated pressure and elevated temperature.

The preferred range of the initiator in the liquid reaction phase is between 0.03 and 0.2 gram/liter. If the concentration falls much below this preferred lower limit, for instance to 0.005 gram/liter, the yield by time and volume is too low and therefore no longer economic.

The pH value of the aqueous reaction medium may be adjusted by any acid which is inert to the reaction. Preferred acids are boric acid, sulfuric acid and hydrochloric acid. The preferred initiators are ammonium peroxydisulfate and potassium peroxydisulfate.

The reaction temperature is in the conventional range. The preferred elevated temperature for the polymerization is between about 80° to 90°C but it is possible to proceed above or below these elevated temperature limits. The elevated pressure used herein is preferably above 20 atmospheres, the most preferred range being between about 30, and 45 atmospheres. If higher pressure, such as 60 atmospheres, are used, no improvement is noted over a polymerization proceeding at about 40 atmospheres so that there is no advantage in using such higher pressures.

During the polymerization, the pH value of the aqueous reaction phase should not fall too low, for instance below about 2. The preferred pH range is between 4 and 6 since a more acidic reaction medium will not only produce corrosion problems but also lower the yield. When the process is continuous, it is useful to adjust the pH of the reaction medium from time to time so as to hold it within the preferred limits.

It is surprising that the polymerization proceeds successfully in the acidic range since it has been preferred to polymerize vinyl halogen monomers, such as vinyl chloride, in alkaline media when it was desired to produce a thermally stable polymer.

The polymerization of vinylidene fluoride in an aqueous medium comprises a heterogenous gas-liquid system. It is, therefore, preferred to use a stirrer in the reaction vessel to produce a sufficiently large contact area between the gasous and liquid phases of the system so that the small amounts of the initiator dissolved in the aqueous phase may catalyze the monomer.

It is a particular advantage of polymerizing in the presence of salts of peroxydisulfuric acid because this produces a colloidal polyvinylidene fluoride dispersion containing polymer particles of uniformly spherical shape having a diameter of about 0.2 micron, without the additional use of an emulsifier in the reaction medium. The polyvinylidene fluoride powder separated from such a dispersion is very pure and its particle size makes it particularly useful for the preparation of coating dispersions which have been successfully used as weather and corrosion resistant coatings on metal surfaces. A further advantage of the use of peroxydisulfates in low concentrations resides in the fact that the polymerization may be carried out at considerably lower pressures.

The maintenance of the hydrogen ion and initiator concentrations within the critical limits of the present invention is particularly readily obtained in a continuous polymerization process. In such a process, the same volume of liquid medium, i.e., a solution of the initiator and an acid in water, is fed into the reaction vessel per time unit as is removed in the form of a polymer dispersion from the vessel. Preferably, the monomer is continuously and automatically fed to the reaction vessel from a storage tank under a gas pressure of the vinylidene fluoride which determines the pressure in the reaction vessel.

The thermal stability of the polymers produced in this process is excellent and compares favorably with that of the commercially available polyvinylidene fluorides produced with organic peroxy initiator compounds.

The following examples further illustrate the process of this invention without in any way limiting the same thereto.

EXAMPLE 1

Eight thousand parts, by volume, of distilled water containing 1.6 parts, by weight, of ammonium peroxydisulfate dissolved therein are fed into a stainless steel autoclave which has a rotary mixer which is coupled to a motor magnetically rather than using a gland guide. Sufficient hydrochloric acid is added to the aquous medium to adjust its pH to 4. The autoclave is closed and flushed with nitrogen. The content of the autoclave is then heated to 84°C, whereupon the remaining chamber of the autoclave is connected to a storage tank containing vinylidene fluoride under a pressure of 32 atmospheres. The monomer entering the autoclave begins to polymerize and this polymerization continues for 3 hours while the pressure and temperature are maintained constant and the polymerization system is strongly stirred by constant operation of the rotary mixer. The polymerization is interrupted by discontinuing the heating and depressurizing the autoclave due to the discontinuance of the monomer feed. The autoclave contains a milky dispersion which is coagulated by adding sodium chloride. The polymer is then filtered, washed and dried. The yield is 1,350 parts, by weight (corresponding to 0.844 kilogram polymer/gram of initiator). The product has a K-value of 74, determined according to DIN 53726 but in a dimethyl formamide solution at 100°C.

EXAMPLE 2

The method and apparatus of Example 1 were used but the initiator was one part, by weight, of potassium peroxydisulfate and the pH was adjusted to 2.9 by the addition of sulfuric acid. The polymerization was continued for 2½ hours at a reaction temperature of 87°C and at a pressure of 34 atmospheres. An aqueous dispersion was obtained, and the yield of polymer was 1,680 parts, by weight, equivalent to 1,680 kg polymer per gram of initiator.

EXAMPLE 3

Example 1 was repeated but the pH of the liquid reaction phase was adjusted to 5.5 by the addition of boric acid, the duration of the polymerization reaction was kept to 1½ hours, the temperature to 83°C and the pressure to 37 atmospheres. The polyvinylidene fluoride yield was 3350 parts, by weight, equivalent to 2,095 kg polymer/gram of initiator. The K-value of the polymer was 64.

EXAMPLE 4

Eight thousand parts, by volume, of distilled water containing 0.25 parts, by weight, of ammonium peroxydisulfate and 50 parts, by weight, of boric acid dissolved therein was placed into an autoclave, the solution having a pH of 5.8. The autoclave was flushed with nitrogen and then vinylidene fluoride was fed into the autoclave at a pressure of 42 atmospheres for 3½ hours while the reaction temperature was held to 81°C. The reaction system was strongly stirred throughout the polymerization. The polymer yield was 1,650 parts, by weight, equivalent to 6,600 kg polymer/ gram of initiator.

EXAMPLE 5

An autoclave with a stirrer and discharge device for the liquid phase was used. The liquid phase consisted of 8,000 parts, by volume, of distilled water containing one part by weight, of ammonium peroxydisulfate and five parts, by weight, of boric acid (pH of the solution = 5.8). Vinylidene fluoride was fed into the autoclave as in the other Examples under a pressure of 38 atmospheres and at a reaction temperature of 88°C for 2 hours in a pre-polymerization step. The resultant polyvinylidene fluoride latex was continuously removed from the autoclave through the discharge device. Simultaneously, a metering pump continuously supplied a corresponding amount of the aqueous reaction medium to the autoclave so that the liquid phase in the autoclave remained constant. Within three hours, 9,000 parts, by volume, of latex were removed from the autoclave while 7,500 parts, by volume, of the latex remained in the autoclave. A total of 3,400 parts, by weight, of polyvinylidene fluoride with a K-value of 63 were obtained, roughly corresponding to 1,600 kg of polymer per gram of initiator. Electronmicroscopic examination of the latex showed spherical particles of uniform diameter of 0.2 to 0.3 micron.

For the sake of comparison, 8,000 parts, by volume, of distilled water containing 80 parts, by weight, of ammonium peroxydisulfate were used as a reaction medium and its pH was adjusted to 8.5 by the addition of ammonium hydroxide. Vinylidene fluoride monomer was fed into the autoclave at a pressure of 34 atmospheres and the reaction temperature was held at 88°C. Polymerization was continued for 4½ hours under constant vigorous stirring of the reaction system. The yield of polyvinylidene fluoride was 1,950 parts, by weight, equivalent to 0.244 kg polymer per gram of initiator. The K-value of the product was 67.

For the examination of the thermal stability, two tests were used to compare the polymers of Examples 1 to 5 with the polymer of the last-mentioned control.

The first test method consisted of placing about one gram of a pure white polymer into a test tube and to expose the same for 30 minutes to a temperature of 300°C. The resultant discoloration was measured.

In the second test method, polyvinylidene fluoride powder was pressed at a temperature of 200°C between hot platens to obtain transparent films having a width of about one centimeter and a length of about 5 cm. These strips were stored in the same oven as used in the first test method for 16 hours at a temperature of 200°C. The resultant discoloration was again measured.

The following table shows the results of these thermal stability tests:

| $PVF_2$ Sample | Test I | Test II |
|---|---|---|
| Example 1 | 1 | 1 |
| Example 2 | 1 | 0 |
| Example 3 | 1 | 0 |
| Example 4 | 1 | 0 |
| Example 5 | 1 | 1 |
| Control | 5 | 3 |

Evaluation: 0 = unchanged
5 = dark brown

The embodiments of the invention in which an exclusive property of privilege is claimed are defined as follows:

1. A process of preparing polyvinylidene fluoride consisting of polymerizing vinylidene fluoride in an aqueous reaction medium at an elevated pressure and elevated temperature in the presence of a peroxydisulfate polymerization initiator in a concentration of between (i) less than 0.5 gram/liter and (ii) 0.0005 gram/liter of the aqueous reaction phase, the polymerization being carried out at an acidic pH, said acidic pH being obtained by the addition of an acid selected from the group consisting of boric acid, sulfuric acid and hydrochloric acid.

2. The process of claim 1 wherein the pH is between 4 and 6.

3. The process of claim 1 wherein the initiator concentration is between 0.03 and 0.2 gram/liter.

4. The process of claim 1 wherein the initiator is selected from the group consisting of ammonium peroxydisulfate and potassium peroxydisulfate.

5. The process of claim 1 wherein the polymerization process is continuous.

* * * * *